United States Patent
Maine et al.

(10) Patent No.: US 11,698,784 B2
(45) Date of Patent: Jul. 11, 2023

(54) UPGRADING AN APPLICATION USING BOOLEAN SATISFIABILITY SOLVING

(71) Applicant: Oracle International Corporation, Redwood Shores, CA (US)

(72) Inventors: David Maine, Greenslopes (AU); Padmanabhan Krishnan, Brisbane (AU); Alexander Jordan, Brisbane (AU); Mahinthan Chandramohan, Mansfield (AU)

(73) Assignee: Oracle International Corporation, Redwood Shores, CA (US)

(*) Notice: Subject to any disclaimer, the term of this patent is extended or adjusted under 35 U.S.C. 154(b) by 57 days.

(21) Appl. No.: 17/515,248

(22) Filed: Oct. 29, 2021

(65) Prior Publication Data
US 2023/0134419 A1    May 4, 2023

(51) Int. Cl.
| | | |
|---|---|---|
| G06F 1/24 | (2006.01) | |
| G06F 9/445 | (2018.01) | |
| G06F 9/50 | (2006.01) | |
| G06F 9/48 | (2006.01) | |
| G06F 9/455 | (2018.01) | |
| G06F 8/65 | (2018.01) | |
| G06F 21/57 | (2013.01) | |

(52) U.S. Cl.
CPC .............. *G06F 8/65* (2013.01); *G06F 21/577* (2013.01); *G06F 2221/033* (2013.01)

(58) Field of Classification Search
CPC .... G06F 8/65; G06F 21/577; G06F 2221/033; G06F 21/51; G06F 8/433; G06F 21/52; G06F 21/563
See application file for complete search history.

(56) References Cited

U.S. PATENT DOCUMENTS 11,113,030 B1 * 9/2021 Monga ...................... G06F 8/10

OTHER PUBLICATIONS

Haghighi et al., An Offloading Strategy in Mobile Cloud Computing Considering Energy and Delay Constraints, 13 pages (Year: 2017).*
Jenson, G. D., et al., "A Formal Framework to Optimise Component Dependency Resolution", In Proceedings of the 2010 Asia Pacific Software Engineering Conference, APSEC '10, Nov. 30, 2010, 8 pages.

(Continued)

*Primary Examiner* — Thuy Dao
(74) *Attorney, Agent, or Firm* — Ferguson Braswell Fraser Kubasta PC

(57) ABSTRACT

A method may including obtaining, for an application, an application dependency including called components, and obtaining, using the called components, a component compatibility graph including a set of nodes and a set of edges each connecting a pair of nodes in the set of nodes. The pair of nodes may include a calling node and a called node. Each node may correspond to a component. The method may further include generating, from the component compatibility graph, a set of constraints including a set of edge variables corresponding to the set of edges, selecting, using the set of constraints, an edge subset of the set of edges, and recommending, for the application, an upgrade solution including installing a called component corresponding to a called node connected by an edge in the edge subset.

20 Claims, 8 Drawing Sheets

(56) References Cited

OTHER PUBLICATIONS

Kalra, S., et al., "Pollux: Safely Upgrading Dependent Application Libraries", In Proceedings of the 2016 24th ACM SIGSOFT International Symposium on Foundations of Software Engineering, Nov. 1, 2016, 7 pages.

Mancinelli, F., et al., "Managing the Complexity of Large Free and Open Source Package-based Software Distributions", In Proceedings 21st IEEE International Conference on Automated Software Engineering, Sep. 18, 2006, 10 pages.

Tucker, C., et al., "Opium: Optimum Package/Install/Uninstall Management", In 29th ACM/IEEE International Conference on Software Engineering May 24, 2007, 10 pages.

* cited by examiner

UPGRADING AN APPLICATION USING BOOLEAN SATISFIABILITY SOLVING

BACKGROUND

When a software application becomes vulnerable due to a security vulnerability in a component of the application, the application may be secured by upgrading the component to a newer version that fixes the security vulnerability. Similarly, when an application becomes outdated due to an outdated component, the application may be updated by upgrading the component. However, the newer version of the component may be incompatible with other components, sub-components, sub-sub-components, etc. When an application has layers of components, each with several versions, efficiently identifying component, sub-component, sub-sub-component, etc. versions that satisfy a set of objectives (e.g., security and/or compatibility objectives) is challenging.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining, for an application, an application dependency including called components, and obtaining, using the called components, a component compatibility graph including a set of nodes and a set of edges each connecting a pair of nodes in the set of nodes. The pair of nodes includes a calling node and a called node. Each node corresponds to a component. The method further includes generating, from the component compatibility graph, a set of constraints including a set of edge variables corresponding to the set of edges, selecting, using the set of constraints, an edge subset of the set of edges, and recommending, for the application, an upgrade solution including installing a called component corresponding to a called node connected by an edge in the edge subset.

In general, in one aspect, one or more embodiments relate to a system including a repository configured to store a component compatibility graph including a set of nodes and a set of edges each connecting a pair of nodes in the set of nodes. The pair of nodes includes a calling node and a called node. Each node corresponds to a component. The repository is further configured to store a set of constraints including a set of edge variables corresponding to the set of edges. The system further includes an AST node including a first value and a second value. The system further includes a computer processor and a constraint solver executing on the computer processor and configured to select, using the set of constraints, an edge subset of the set of edges. The system further includes an upgrade manager executing on the computer processor and configured to: obtain, for an application, an application dependency including called components, obtain, using the called components, the component compatibility graph, generate, from the component compatibility graph, the set of constraints including a set of edge variables corresponding to the set of edges, and recommend, for the application, an upgrade solution including installing a called component corresponding to a called node connected by an edge in the edge subset.

In general, in one aspect, one or more embodiments relate to a method including obtaining, for an application, an application dependency including called components, and sending the application dependency to an upgrade manager configured to perform configured to perform: obtaining, using the called components, a component compatibility graph including a set of nodes and a set of edges each connecting a pair of nodes in the set of nodes. The pair of nodes includes a calling node and a called node. Each node corresponds to a component. The upgrade manager is further configured to perform generating, from the component compatibility graph, a set of constraints including a set of edge variables corresponding to the set of edges, selecting, using the set of constraints, an edge subset of the set of edges, and recommending, for the application, an upgrade solution including installing a called component corresponding to a called node connected by an edge in the edge subset, and transmitting the upgrade solution. The method further includes receiving, from the upgrade manager, the upgrade solution.

Other aspects of the invention will be apparent from the following description and the appended claims.

DETAILED DESCRIPTION

Figure 1A:
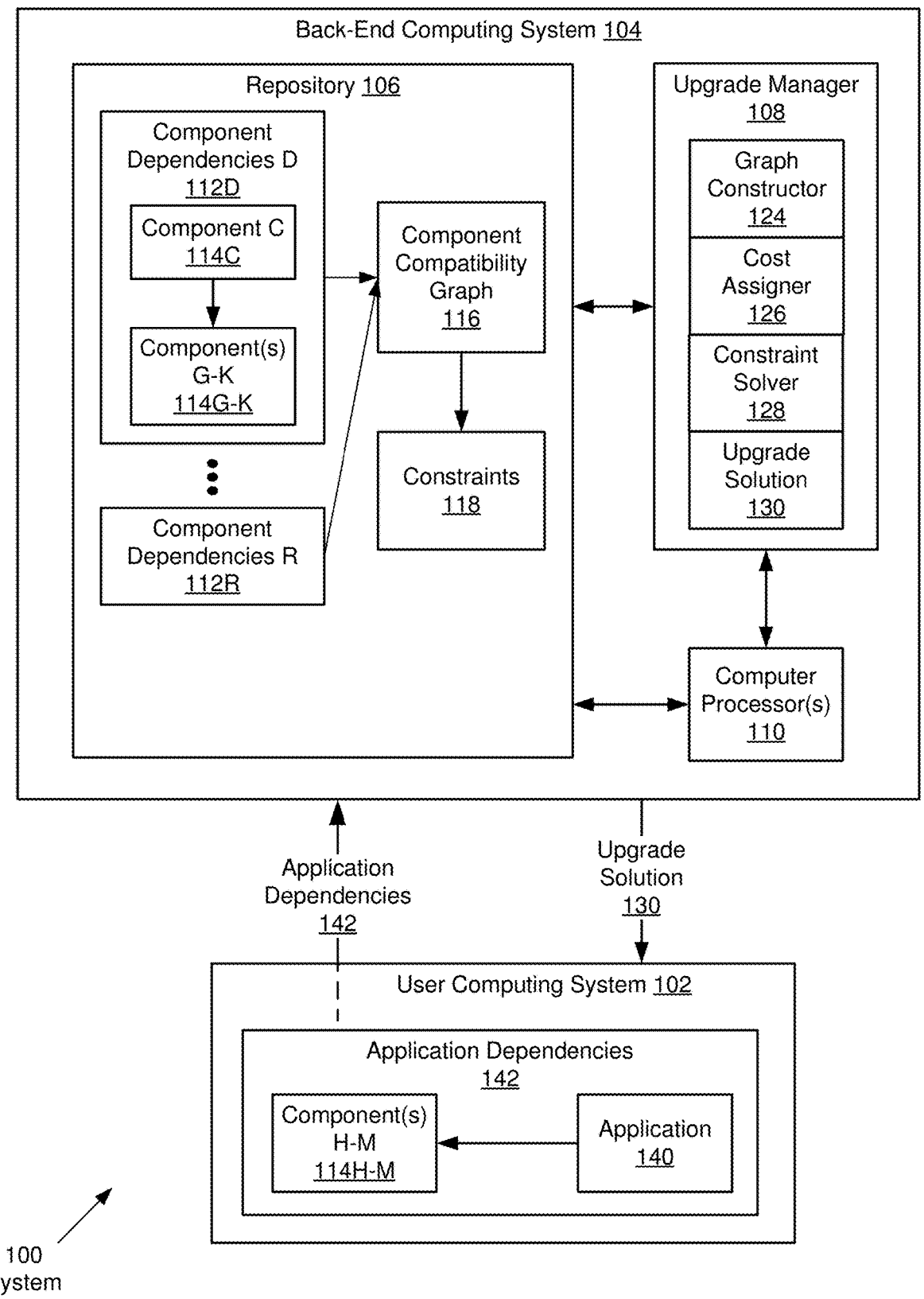
FIG. 1A, FIG. 1B, and FIG. 1C show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to upgrading an application. An application's dependencies indicates components upon which the application depends (e.g., calls). Similarly, component dependencies indicate, for a component, other components upon which the component depends. A component compatibility graph may be obtained using the application dependencies and the component dependencies. The component compatibility graph includes nodes and edges each connecting a pair of nodes, where each node corresponds to a component. A cost for an edge may be obtained indicating a level of incompatibility between the components corresponding to the pair of nodes connected by the edge. For example, the cost may include development, testing and/or licensing costs.

Constraints including edge variables corresponding to the edges may be generated from the component compatibility graph. The constraints are propositions that represent the semantics of the application dependencies and component dependencies. A constraint includes variables corresponding to the nodes and/or edges. Different types of constraints are used to represent different semantics of the application dependencies and component dependencies. An edge subset may be selected by applying a constraint solver to the constraints. The constraint solver may select the edge subset by finding an assignment of Boolean values that satisfies the constraints. For example, the lowest cost edge subset may be selected. The edge subset corresponds to an upgrade solution for the application. The upgrade solution may include installing the components corresponding to the nodes connected by the edges in the edge subset.

FIG. 1A shows a system (100) in accordance with one or more embodiments of the invention. As shown in FIG. 1A, the system (100) includes a user computing system (102) and a back-end computing system (104). In one or more embodiments, the user computing system (102) and the back-end computing system (104) take the form of the computing system (500) described with respect to FIG. 5A and the accompanying description below or take the form of the client device (526) described with respect to FIG. 5B.

The back-end computing system (104) includes a repository (106), an upgrade manager (108), and computer processor(s) (110). In one or more embodiments, the repository (106) is any type of storage unit and/or device (e.g., a file system, database, collection of tables, or any other storage mechanism) for storing data. Further, the repository (106) may include multiple different storage units and/or devices. The multiple different storage units and/or devices may or may not be of the same type or located at the same physical site. The repository (106) may be accessed online via a cloud service (e.g., Oracle Cloud, Amazon Web Services (AWS), Egnyte, Azure, etc.).

In one or more embodiments, the repository (106) includes functionality to store component dependencies (112D, 112R), a component compatibility graph (116), and constraints (118). A component dependency (e.g., component dependency D (112D)) indicates, for a component (e.g., component C (114C)), other components (e.g., components G-K (114G-K)) upon which the component depends. The components are collections of statements (e.g., computer instructions) written in source code of a human-readable programming language. A component may be labeled with a component identifier and a version identifier. FIG. 4B shows an example of a component identifier (412) and a version identifier (414) for a component. For example, component C (114C) depends on (e.g., may call) components G-K (114G-K). Within the context of component dependency D (112D), component C (114C) may be referred to as the calling component, and components G-K (114G-K) may be referred to as the called components. For example, the calling component may call the called components via application programming interfaces (APIs) provided by the called components.

In one or more embodiments, the component dependencies (112D, 112R) are represented using Boolean expressions. For example, a component dependency may be represented as a disjunctive expression indicating that a disjunction (i.e., a logical "or") of called components are to be installed when the calling component is installed. Installing a component may include compiling and/or linking the component with other components. For example, the disjunctive expression may indicate that the disjunction of (i.e., at least one of) called components are to be installed when the calling component is installed. Such a component dependency may be referred to as a disjunctive dependency. Additionally or alternatively, a component dependency may be represented as a conjunctive expression indicating that that a conjunction (i.e., a logical "and") of called components are to be installed when the calling component is installed. For example, the conjunctive expression may indicate that the conjunction of called components are to be installed when the calling component is installed. Such a component dependency may be referred to as a conjunctive dependency. In one or more embodiments, a component dependency may be represented as a disjunctive expression nested within a conjunctive expression, or vice versa.

Figure 1B:
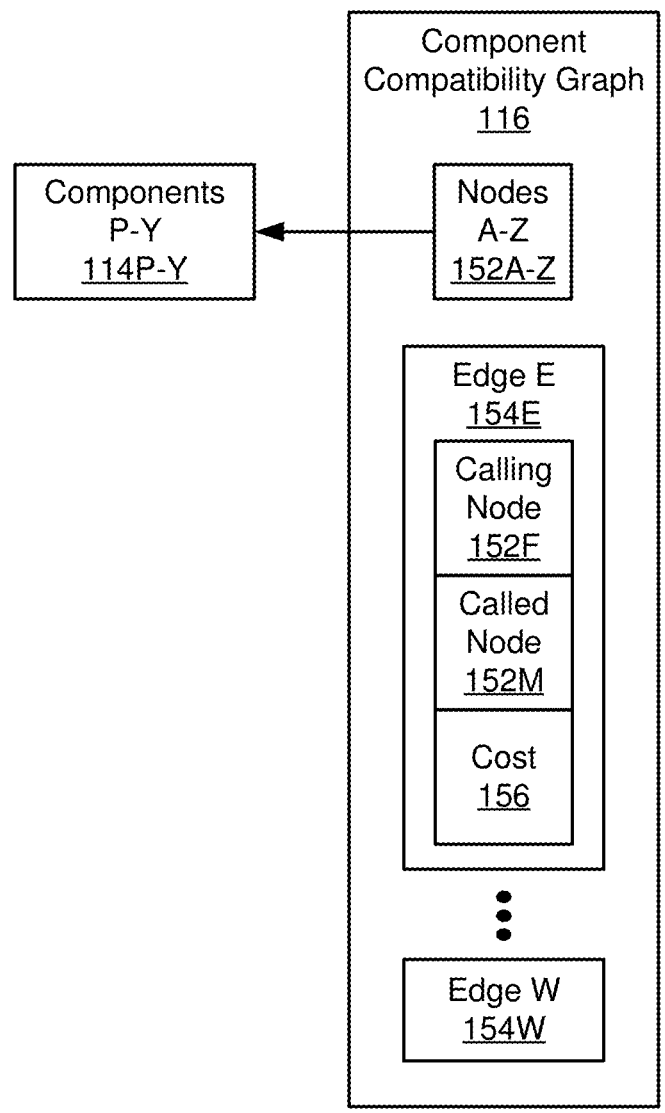

The component compatibility graph (116) is a graph representation of the component dependencies (112D, 112R). In one or more embodiments, the compatibility graph (116) further represents the application dependencies (142), described below. Turning to FIG. 1B, the component compatibility graph (116) includes nodes (152A-Z) and edges (154E, 154W). The nodes (152A-Z) correspond to components (e.g., components P-Y (114P-Y)). An edge (e.g., edge E (154E)) includes a calling node (e.g., node F (152F)), a called node (e.g., node F (152M)), and a cost (156). In one or more embodiments, a calling node may correspond to the application (140). The cost (156) represents a level of incompatibility between the components corresponding to the calling node and the called node.

The cost (156) may depend on an edge type of the corresponding edge (e.g., edge (154E)). The edge type may be "natural" edge when the components corresponding to the calling node and the called node are deemed to be compatible. For example, components that are compatible may have been jointly developed, tested and/or licensed. Continuing this example, the natural edge may be assigned a zero cost, indicating that there is no incompatibility between the two components. In one or more embodiments, an edge is assumed to be a natural edge when the edge's calling node and called node correspond to a calling component and called component, respectively, of a component dependency.

Alternatively, the edge type may be "non-natural" edge when the components corresponding to the calling node and the called node have not been deemed to be compatible. For example, additional development, testing and/or licensing may be needed in order for two incompatible components to function together. Continuing this example, the non-natural edge may be assigned a nonzero cost, indicating that there is some incompatibility between the components corresponding to the calling node and the called node of the non-natural edge. For example, the incompatibility may be due to incompatible APIs, semantic incompatibility, failure to compile, runtime issues, etc.

Figure 1C:
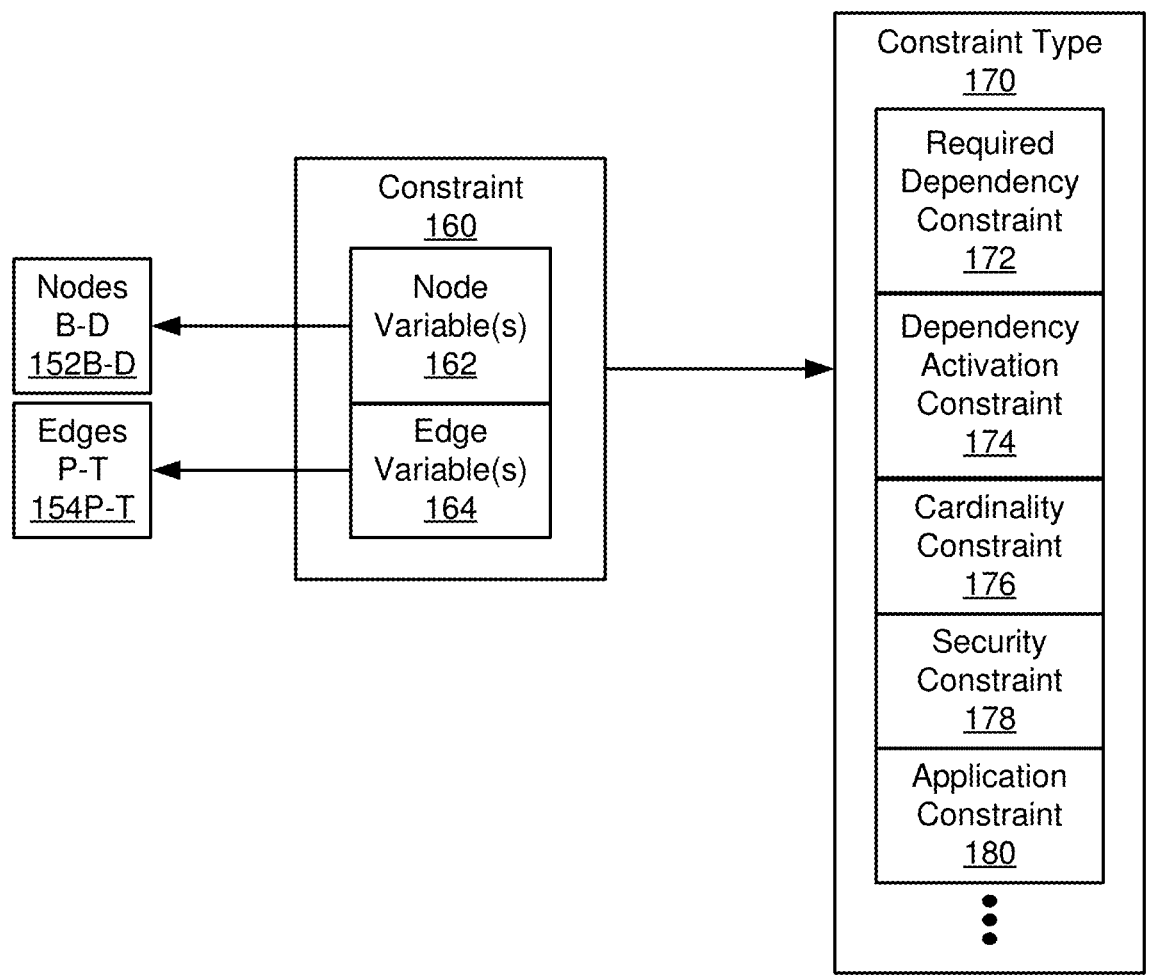

Returning to FIG. 1A, the constraints (118) are propositions (e.g., Boolean expressions) that represent the semantics of the application dependencies (142) and/or the component dependencies (112D, 112R). Turning to FIG. 1C, a constraint (160) includes one or more node variables (162) and/or one or more edge variables (164). The one or more node variables (162) correspond to one or more nodes (e.g., nodes B-D (152B-D)) of the component compatibility graph (116). The one or more edge variables (164) correspond to one or more edges (e.g., edges P-T (154P-T)) of the component compatibility graph (116). The constraint (160) may correspond to a constraint type (170). A constraint type (170) may be required dependency constraint (172), dependency activation constraint (174), cardinality constraint (176), security constraint (178), application constraint (180) etc.

A required dependency constraint (172) may indicate that at least one version of a group of versions of a called component is to be installed when the calling component is installed. Thus, a required dependency constraint (172) corresponds to a disjunctive dependency. A required dependency constraint (172) may include:

1) a node variable corresponding to a calling node, and
2) two or more edge variables corresponding to edges connecting the calling node to two or more called nodes corresponding to different versions of a called component. That is, the called nodes may correspond to called components labeled with the same component identifier and different version identifiers. The required dependency constraint (172) indicates that installing the calling component corresponding to the calling node requires installing at least one of the called components corresponding to the called nodes. For example, if a disjunctive dependency includes calling component $A_1$ and called components $B_1$, $B_2$, and $B_3$, then the following required dependency constraint may be generated:

$$\sim A_1 \lor (A_1, B_1) \lor (A_1, B_2) \lor (A_1, B_3),$$

where $A_1$ is a node variable corresponding to the node for component $A_1$, and where $(A_1, B_1)$, $(A_1, B_2)$, and $(A_1, B_3)$, are edge variables corresponding to the edges connecting components $A_1$ and $B_1$, components $A_1$ and $B_2$, and components $A_1$ and $B_3$, respectively.

The above required dependency constraint indicates that installing component $A_1$ (i.e., the calling component) requires installing at least one of component $B_1$, component $B_2$, and component $B_3$ (i.e., the called components).

The required dependency constraint (172) may correspond to two or more dependency activation constraints (174). The dependency activation constraints (174) may have the effect of "activating" the called nodes of the edges corresponding to the edge variables of the required dependency constraint (172) by setting the node variables corresponding to the called nodes to "true." Setting a node variable corresponding to a called node to "true" may indicate that the called component corresponding to the called node is to be installed as part of an upgrade solution (130). A dependency activation constraint (174) may include:

1) an edge variable of the corresponding required dependency constraint (172), and
2) a node variable corresponding to a called node of an edge corresponding to the edge variable.

Continuing the above example, the following dependency activation constraints may be generated corresponding to the above required dependency constraint:

1) $\sim(A_1, B_1) \lor B_1$,
2) $\sim(A_1, B_2) \lor B_2$, and
3) $\sim(A_1, B_3) \lor B_3$.

A cardinality constraint (176) indicates an upper bound on the number of versions of a component to be installed. For example, the upper bound may be 1, indicating that at most one version of a component may be installed. In general, the upper bound may be N, indicating that at most N versions of a component may be installed. A cardinality constraint (176) includes two or more node variables corresponding to nodes each corresponding to a different version of a component. As an example of a cardinality constraint with an upper bound of 1, if component $B_1$, component $B_2$, and component $B_3$ are different versions of a component, then the following cardinality constraint may be generated:

$$(B_1 \rightarrow (\sim B_2 \land \sim B_3)) \land (B_2 \sim (\sim B_1 \land \sim B_3)) \land (B_3 \rightarrow (\sim B_1 \land \sim B_2)),$$

where $B_1$, $B_2$, and $B_3$ are node variables corresponding to the nodes for components $B_1$, $B_2$, and $B_3$, respectively.

A security constraint (178) includes a node variable corresponding to a node that corresponds to a component to be excluded from installation (e.g., excluded from installation in an upgrade solution (130)). The excluded component may be a component with a security vulnerability (e.g., a vulnerability to one or more types of malicious attacks). For example, the excluded component may be included in a list of excluded components (e.g., components with known vulnerabilities). Alternatively, the excluded component may be a component that is out-of-date. The security constraint (178) may be represented as a negation: $\sim X$, where X is a node variable corresponding to a node corresponding to the excluded component.

An application constraint (180) includes a node variable corresponding to a node corresponding to the application (140). The application constraint (180) indicates that the application (140) is to be installed (e.g., because an upgrade solution (130) for an application (140) necessarily includes installation of the application (140)). The application constraint (180) may be represented as "A," where A is the node variable corresponding to the node corresponding to the application (140).

The upgrade manager (108) includes functionality to recommend, for an application (140), an upgrade solution (130). The upgrade solution (130) may include installing one or more components corresponding to called nodes included in a subset of edges of the component compatibility graph (116) that satisfy a set of constraints. The upgrade manager (108) includes a graph constructor (124), a cost assigner (126), and a constraint solver (128). The graph constructor (124) includes functionality to construct the component compatibility graph (116). The cost assigner (126) includes functionality to assign costs to the edges of the component compatibility graph (116).

The constraint solver (128) includes functionality to determine whether a subset of edges satisfies constraints (118). For example, the constraint solver (128) may include functionality to solve the Boolean satisfiability problem by finding one or more assignments to Boolean variables (e.g., node variables and/or edge variables) that satisfy the constraints (118). The constraint solver (128) may receive, as input, a Boolean formula, and output a satisfying Boolean assignment to the variables used in the Boolean formula. If the constraint solver (128) fails to find such a satisfying Boolean assignment, then the constraint solver (128) indicates that the Boolean formula is unsatisfiable. Alternatively, the constraints may be expressed as inequalities and the constraint solver (128) may be implemented using integer linear programming (ILP).

The user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) includes functionality to send application dependencies (142) to the upgrade manager (108) of the back-end computing system (104). Application dependencies (142) indicate, for an application (140), components (e.g., components H-M (114H-M)) upon which the application (140) depends. The application (140) is a collection of statements (e.g., computer instructions) written in source code of a human-readable programming language. Within the context of an application dependency, the application (140) is the calling component, and the components in the application dependency are the called components. Similar to component dependencies (112D, 112R), application dependencies (142) may be represented as one or more Boolean expressions.

The application dependencies (142) may be stored in a file in the memory of the user computing system (102). For example, the file may include a Maven project object model (POM) that indicates, for the application (140), the components upon which the application (140) or component depends. Alternatively or additionally, the file including the application dependencies (142) may be stored in the repository (106) of the back-end computing system (104).

The user computing system (102) includes functionality to receive an upgrade solution (130) from the upgrade manager (108). The user computing system (102) includes functionality to upgrade the application (140) using the upgrade solution (130).

In one or more embodiments, the computer processor(s) (110) takes the form of the computer processor(s) (502) described with respect to FIG. 5A and the accompanying description below. In one or more embodiments, the computer processor (110) includes functionality to execute the upgrade manager (108).

While FIG. 1A shows a configuration of components, other configurations may be used without departing from the scope of the invention. For example, various components may be combined to create a single component. As another example, the functionality performed by a single component may be performed by two or more components.

Figure 2:
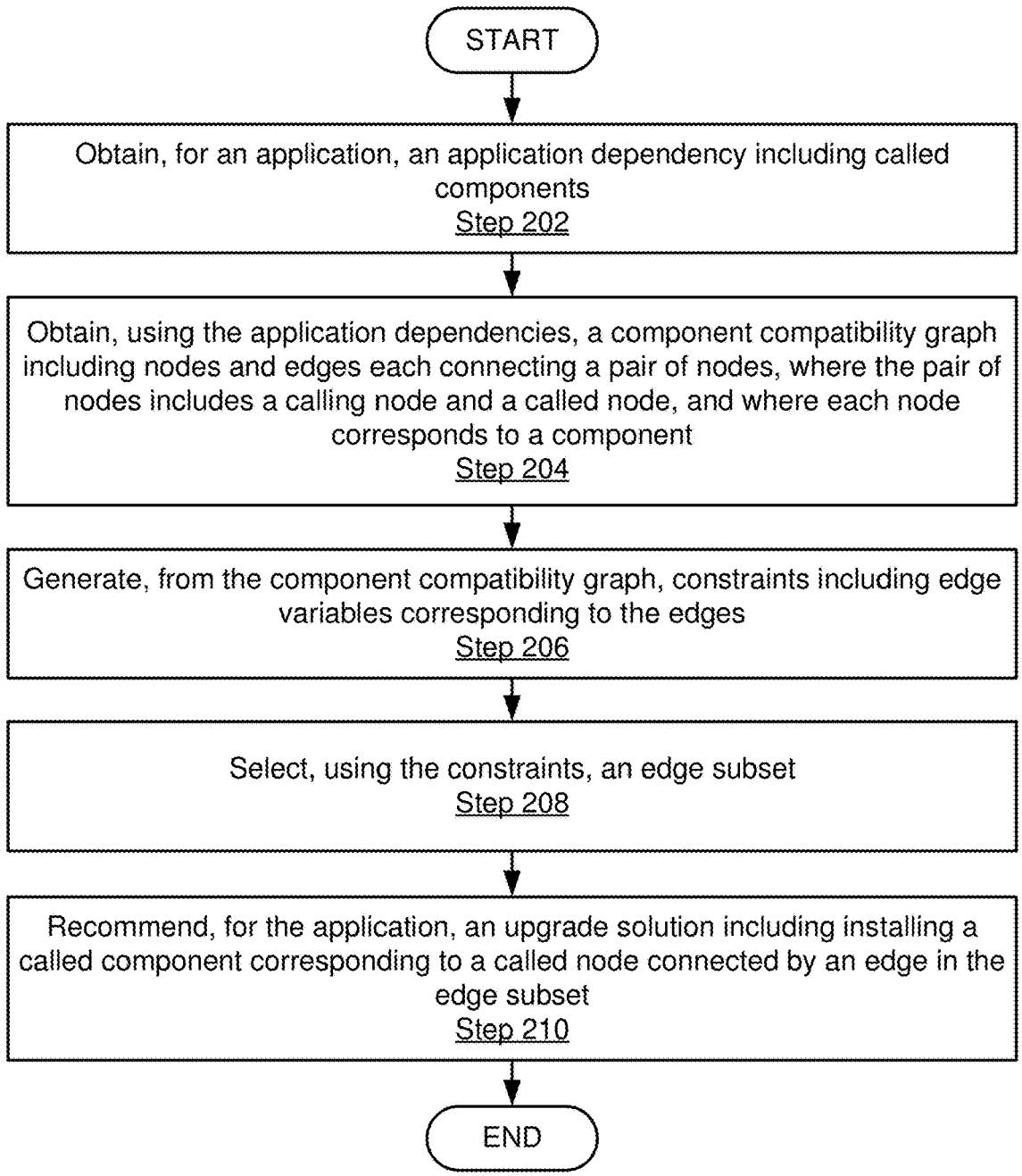
FIG. 2 and FIG. 3 show flowcharts in accordance with one or more embodiments of the invention.

FIG. 2 shows a flowchart in accordance with one or more embodiments of the invention. The flowchart depicts a process for upgrading an application. One or more of the steps in FIG. 2 may be performed by the components (e.g., the upgrade manager (108) of the back-end computing system (104) and/or the user computing system (102), discussed above in reference to FIG. 1A). In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, an application dependency including called components is obtained for an application. The upgrade manager may obtain the application dependency from a file of the user computing system (e.g., a Maven project object model (POM) file). The upgrade manager may obtain the application dependency in response to an announcement of a vulnerability in a component included in the application dependency. For example, the announcement of the vulnerability may trigger a request to upgrade the application. Alternatively, the upgrade manager may obtain the application dependency in response to an announcement that a component included in the application dependency has become out-of-date. For example, the component may have become discontinued (e.g., end-of-lifed) or deprecated. The upgrade manager may obtain multiple application dependencies for the application.

In Step 204, a component compatibility graph is obtained using the called components. The component compatibility graph includes nodes and edges each connecting a pair of nodes, where the pair of nodes includes a calling node and a called node. Each node corresponds to a component. The upgrade manager may obtain the component compatibility graph from the graph constructor.

The graph constructor may construct the component compatibility graph by performing the following steps:
1) adding nodes corresponding to the called components included in each application dependency obtained by the upgrade manager.
2) obtaining, for the components included in the application dependency, component dependencies including additional called components. For example, the graph constructor may obtain the component dependencies from a Maven project object model (POM) that indicates, for each component, other components upon which the component depends.
3) adding additional nodes corresponding to the additional called components in the component dependencies.
4) adding edges between the called components included in the application dependencies and the calling components specified in the component dependencies.
5) adding additional nodes for available versions of a called component and connecting each version, via a non-natural edge, to the corresponding calling component specified in the component dependencies.

The graph constructor may then recursively examine the component dependencies while adding, to the component compatibility graph, calling nodes and called nodes corresponding to the calling components and called components, respectively, of successive (e.g., transitive) component dependencies. The graph constructor may further add edges between the calling node and the called nodes of each component dependency. In addition, the graph constructor may further add edges between the called nodes of a component dependency and the calling nodes of a successive component dependency.

The upgrade manager may obtain, from the cost assigner, costs for the edges each indicating a level of incompatibility between the components corresponding to the pair of nodes connected by the respective edge. The cost of an edge may depend on the edge type of the edge. For example, an edge whose edge type is "natural edge" may be assigned a zero cost.

Alternatively, the cost assigner may assign a nonzero cost to an edge whose edge type is "non-natural edge." For example, the cost assigner may assign a cost to a non-natural edge by determining a number of publicly visible changes in a component corresponding to a called node connected by the non-natural edge. For example, the cost assigned to the non-natural edge may be proportional to the number of publicly visible changes. The cost assigner may determine the number of publicly visible changes in the component using an API analysis tool such as the Revapi Maven plugin.

In one or more embodiments, the non-natural edge may be assigned a cost using an objective function. For example, the objective function may favor recent versions of a component over older versions of the component. As another example, the objective function may assign a high cost to a component with a known vulnerability.

In Step 206, constraints including edge variables corresponding to the edges are generated from the component compatibility graph. The upgrade manager may generate the constraints as follows, while recursively traversing the component compatibility graph:
1) Generate Boolean variables for the nodes and edges of the component compatibility graph. For example, if the component compatibility graph includes edges from node $A_1$ to nodes $B_1$, $B_2$, and $B_3$, then the upgrade manager may generate node variables $A_1$, $B_1$, $B_2$, and $B_3$, and edge variables $(A_1, B_1)$, $(A_1, B_2)$, and $(A_1, B_3)$.

2) Group the edges by component dependency and/or application dependency. For example, if node $A_1$ is a calling node in edges connected to called nodes $B_1$, $B_2$, and $B_3$, and a component dependency (e.g., a disjunctive dependency) indicates that component $A_1$ installs component $B_1$, component $B_2$, or component $B_3$, then the upgrade manager may group the edges $(A_1, B_1)$, $(A_1, B_2)$, and $(A_1, B_3)$.

3) Add a required dependency constraint corresponding to edges corresponding to a disjunctive dependency. The required dependency constraint may indicate that at least one version of a group of versions of a called component is to be installed when the calling component is installed.

4) Add dependency activation constraints corresponding to each required dependency constraint. The dependency activation constraints may have the effect of setting node variables corresponding to called nodes to "true," indicating that the called components corresponding to the called nodes are to be installed as part of an upgrade solution.

5) Add a cardinality constraint including node variables corresponding to nodes each corresponding to a different version of a component. The cardinality constraint indicates an upper bound on the number of versions of a component to be installed.

6) Add security constraints that include node variables corresponding to nodes each corresponding to an excluded component. Each excluded component may be excluded from installation in the upgrade solution for the application. For example, the excluded component may be a component with a security vulnerability or may be a component that is out-of-date.

7) Add an application constraint including an application variable that corresponds to the application. The application constraint indicates that the application is installed in the upgrade solution for the application.

In Step 208, an edge subset is selected using the constraints. The constraint solver may select the edge subset by finding an assignment of Boolean values to the node variables and/or the edge variables that satisfies the constraints. That is, constraint solver may add, to the edge subset, edges corresponding to edge variables assigned a value of "true." The edge subset corresponds to an upgrade solution for the application. The upgrade solution for the application may include installing the components corresponding to the nodes connected by the edge subset.

If the constraint solver finds more than one assignment of Boolean values to the edge variables that satisfies the constraints, the constraint solver may select the edge subset using the costs assigned to the edges. For example, the lowest cost edge subset may be selected, where the cost of each edge subset may be calculated as the sum of the costs assigned to the edges in the edge subset. Alternatively or additionally, the constraint solver may identify multiple edge subsets that satisfy the constraints. For example, the constraint solver may rank the multiple edge subsets by cost.

In one or more embodiments, the constraint solver may use heuristics to reduce the number of possible assignments of Boolean values to the edge variables. For example, a heuristic may prohibit downgrading a component to an earlier version (e.g., to a component with a lower version identifier) or may require that a components be upgraded to major releases (e.g., to components whose version identifiers match a specific pattern). Alternatively, the heuristics may be represented using constraints.

In Step 210, an upgrade solution including installing a called component corresponding to a called node connected by an edge in the edge subset is recommended for the application. The upgrade solution includes installing the called components corresponding to the nodes connected by the edges in the edge subset. Alternatively, the upgrade manager may output multiple upgrade solutions, ranked by cost.

The upgrade solution may be presented to a user (e.g., a software developer or information technology administrator) for review. For example, the upgrade solution may be presented to the user via a graphical user interface (GUI) of the user computing system, where the user may approve or reject the upgrade solution.

Figure 3:
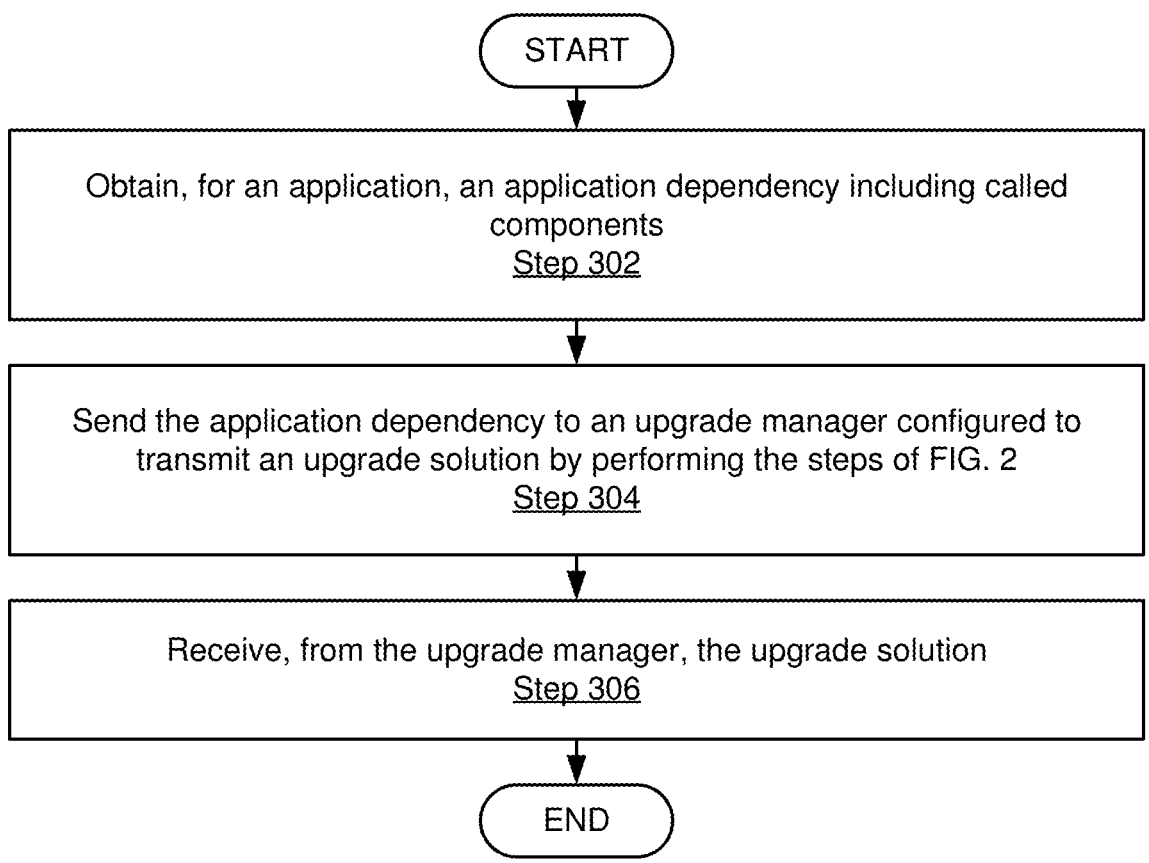

FIG. 3 shows a flowchart in accordance with one or more embodiments of the invention. The flowchart depicts a process for upgrading an application. One or more of the steps in FIG. 3 may be performed by the components (e.g., the upgrade manager (108) of the back-end computing system (104) and/or the user computing system (102), discussed above in reference to FIG. 1A). In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, an application dependency including called components is obtained for an application (see description of Step 202 above).

In Step 304, the application dependency is sent to an upgrade manager configured to transmit an upgrade solution by performing the steps of FIG. 2. The application dependency may be sent to the upgrade manager via a network.

In Step 306, the upgrade solution is received from the upgrade manager. The upgrade solution may be received from the upgrade manager via the network.

FIG. 4A, FIG. 4B, FIG. 4C, and FIG. 4D show implementation examples in accordance with one or more embodiments. The implementation examples are for explanatory purposes only and not intended to limit the scope of the invention. One skilled in the art will appreciate that implementation of embodiments of the invention may take various forms and still be within the scope of the invention.

Figure 4A:
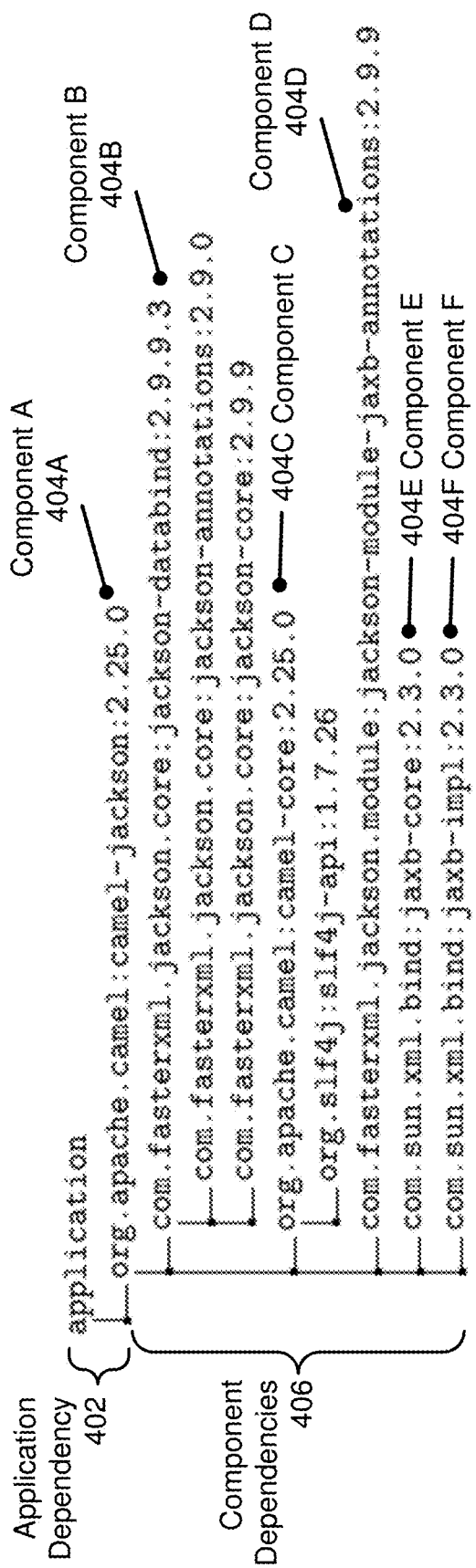
FIG. 4A, FIG. 4B, FIG. 4C, and FIG. 4D show an example in accordance with one or more embodiments of the invention.
Figure 4B:
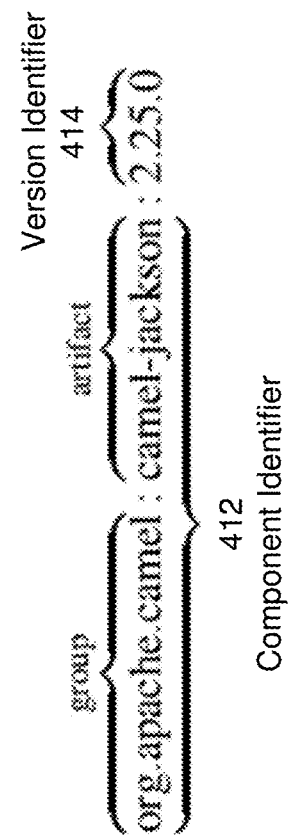

FIG. 4A shows an application dependency (402) ((142) in FIG. 1A) that includes component A (404A) ((114H-M, 114C, 114G-K) in FIG. 1A and (114P-Y) in FIG. 1B), upon which an application depends (e.g., calls). FIG. 4A further shows component dependencies (406) ((112D, 112R) in FIG. 1A) that include components (404B, 404C, 404D, 404E, 404F) upon which component A (404A) depends. Component A (404A) plays the role of called component in the application dependency (402) and component A (404A) plays the role of calling component in the component dependencies (406). If component B (404B) has a vulnerability, then a safe version of component B (404B) may be required in an upgrade solution for the application, such that the safe version of component B (404B) is compatible with component A (404A), which calls component B (404B). FIG. 4B shows the component identifier (412) and version identifier (414) that identify component A (404A).

Figure 4C:
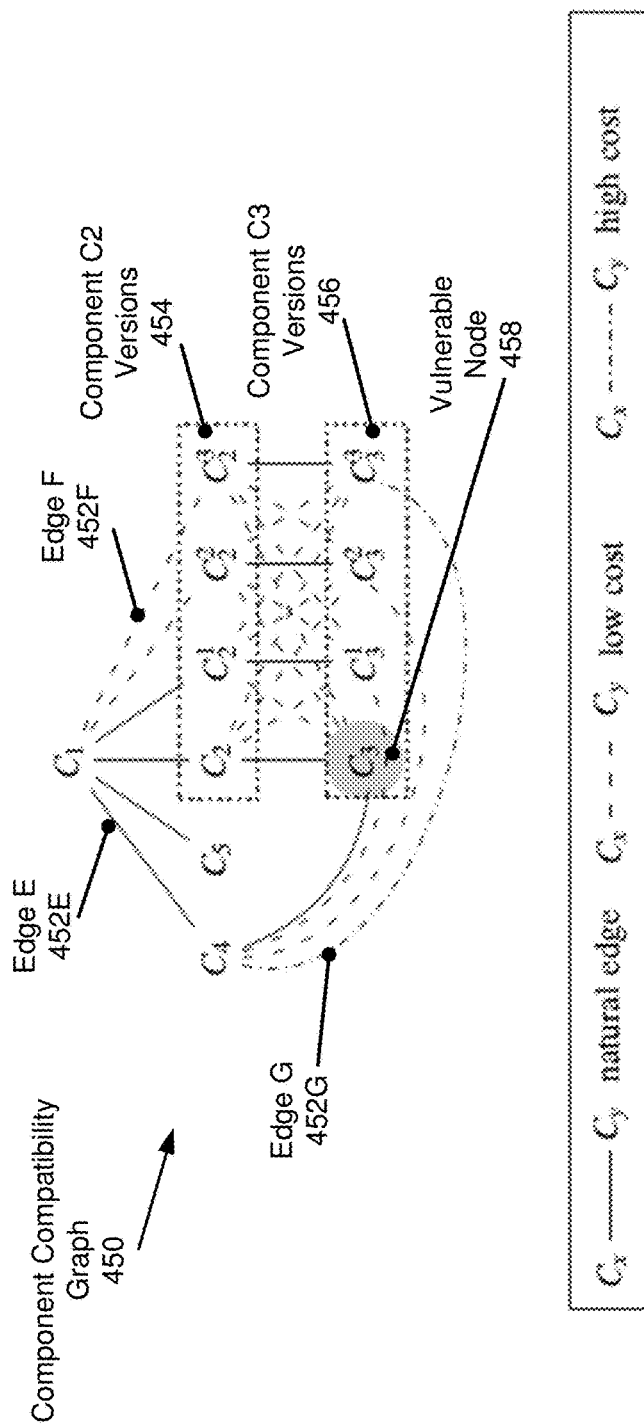

FIG. 4C shows a component compatibility graph (450) ((116) in FIG. 1A and FIG. 1B) that includes natural edges and non-natural edges. Edge E (452E) is an example of a natural edge connecting component $C_1$ and component $C_4$. Edge F (452F) is an example of a low cost non-natural edge connecting component $C_1$ and component $C_2{}^3$. Edge G (452G) is an example of a high cost non-natural edge connecting component $C_4$ and component $C_3{}^3$. FIG. 4C further shows four component $C_2$ versions (454) and four component $C_3$ versions (456).

Figure 4D:
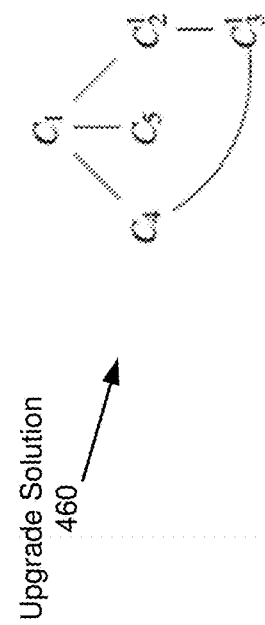

FIG. 4C shows that component $C_3$ corresponds to a vulnerable node (458). Because the component compatibility graph (450) includes a vulnerable node (458), an upgrade solution (460) ((130) in FIG. 1A) is recommended, as shown in FIG. 4D. The upgrade solution (460) is required to include a safe, non-vulnerable version of component $C_3$. The constraint solver finds an upgrade solution (460) that includes component $C_3{}^1$, a safe, non-vulnerable version of component $C_3$. The upgrade solution (460) also includes component $C_2{}^1$, which is connected via a natural edge to component $C_3{}^1$. component $C_2{}^1$ is also connected via a natural edge to component $C_1$. Because all of the components in the upgrade solution (460) are connected by natural edges, each of which has zero cost, the upgrade solution (460) is a lowest cost solution.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
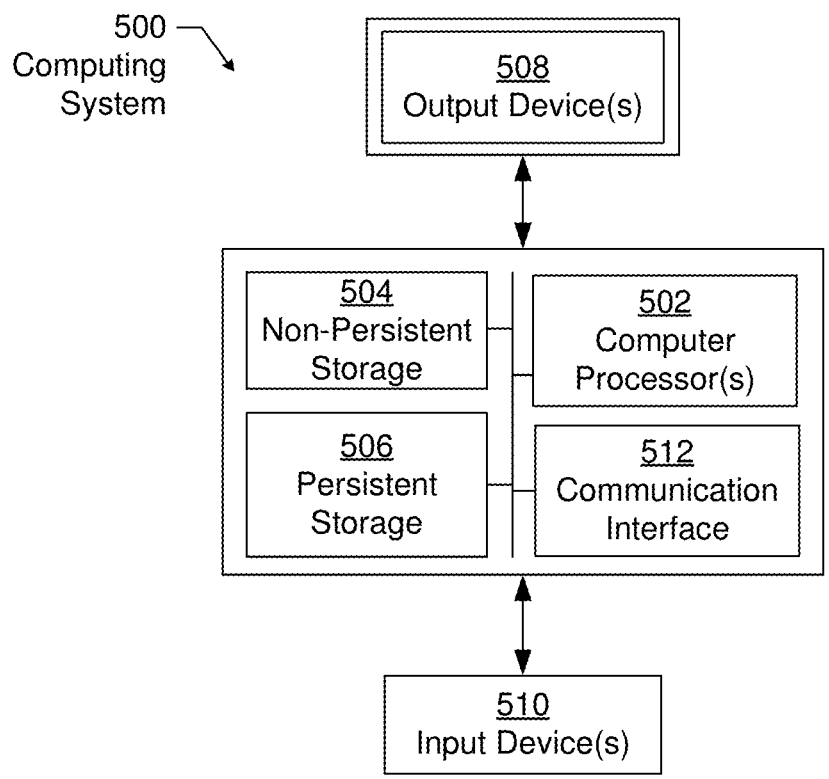
FIG. 5A and FIG. 5B show computing systems in accordance with one or more embodiments of the invention.
Figure 5B:
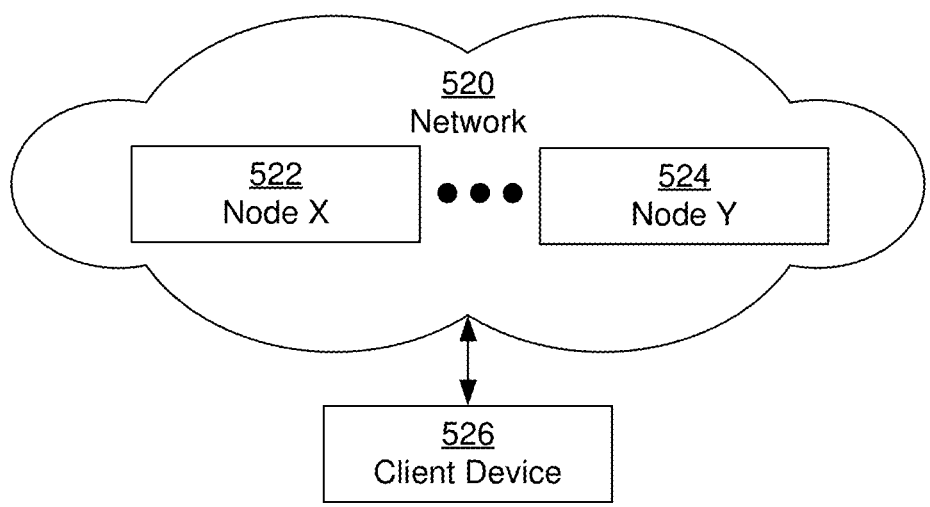

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
obtaining, for an application, a first application dependency comprising first called components;
obtaining, using the first called components, a component compatibility graph comprising a first set of nodes and a first set of edges each connecting a pair of nodes in the first set of nodes, wherein the pair of nodes comprises a calling node and a called node, and wherein each node of the first set of nodes corresponds to a component;
generating, from the component compatibility graph, a set of constraints comprising a set of edge variables corresponding to the first set of edges;
selecting, using the set of constraints, a first edge subset of the first set of edges; and
recommending, for the application, an upgrade solution comprising installing a first called component corresponding to a first called node connected by a first edge in the first edge subset.

2. The method of claim 1, further comprising:
obtaining, for the first set of edges, a set of costs indicating a level of incompatibility between the components corresponding to a pair of nodes connected by the respective edge,
wherein the first edge subset is selected using the set of costs.

3. The method of claim 2, further comprising:
determining a number of publicly visible changes in a component corresponding to a second called node connected by a second edge of the first set of edges,
wherein the cost for the second edge is obtained using the number of publicly visible changes.

4. The method of claim 1,
wherein the first set of nodes comprises a first calling node corresponding to a calling component,
wherein the first set of edges comprises a second edge subset connecting the first calling node to a set of called nodes corresponding to different versions of a called component,
wherein the set of constraints comprises a required dependency constraint comprising a calling node variable corresponding to the first calling node and a subset of the set of edge variables corresponding to the second edge subset, and
wherein the required dependency constraint indicates that installing the calling component requires installing, in the upgrade solution, at least one of the different versions of the called component.

5. The method of claim 1,
wherein the first set of nodes comprises a second called node corresponding to a vulnerable component with a security vulnerability,
wherein the set of constraints comprises a security constraint comprising a negation of a called node variable corresponding to the second called node, and
wherein the security constraint prevents installation of the vulnerable component in the upgrade solution.

6. The method of claim 1,
wherein the first set of nodes comprises set of called nodes corresponding to different versions of a called component,
wherein the set of constraints comprises a cardinality constraint comprising a set of called node variables corresponding to the set of called nodes, and
wherein the cardinality constraint indicates that at most one of the different versions of the called component is installed in the upgrade solution.

7. The method of claim 1, further comprising:
adding, to the component compatibility graph, a second set of nodes corresponding to the first called components;
obtaining, for the first called components, component dependencies comprising second called components;
adding, to the component compatibility graph, a third set of nodes corresponding to the second called components; and
adding, to the component compatibility graph, a second set of edges between the called components in the application dependencies and the calling components in the component dependencies.

8. A system, comprising:
a repository configured to store:
  a component compatibility graph comprising a first set of nodes and a first set of edges each connecting a pair of nodes in the first set of nodes, wherein the pair of nodes comprises a calling node and a called node, and wherein each node of the first set of nodes corresponds to a component, and
  a set of constraints comprising a set of edge variables corresponding to the first set of edges;
a computer processor;
a constraint solver executing on the computer processor and configured to select, using the set of constraints, a first edge subset of the first set of edges; and
an upgrade manager executing on the computer processor and configured to:
  obtain, for an application, a first application dependency comprising first called components,
  obtain, using the first called components, the component compatibility graph,
  generate, from the component compatibility graph, the set of constraints, and
  recommend, for the application, an upgrade solution comprising installing a first called component corresponding to a first called node connected by a first edge in the first edge subset.

9. The system of claim 8, further comprising a cost assigner executing on the computer processor and configured to:
obtain, for the first set of edges, a set of costs each indicating a level of incompatibility between the pair of nodes connected by the respective edge,
wherein the constraint solver selects the first edge subset using the set of costs.

10. The system of claim 9, wherein the cost assigner is further configured to:
determine a number of publicly visible changes in a component corresponding to a second called node connected by a second edge of the first set of edges,
wherein the cost assigner obtains the cost for the edge using the number of publicly visible changes.

11. The system of claim 8,
wherein the first set of nodes comprises a first calling node corresponding to a calling component,
wherein the first set of edges comprises a second edge subset connecting the first calling node to a set of called nodes corresponding to different versions of a called component,
wherein the set of constraints comprises a required dependency constraint comprising a calling node variable corresponding to the first calling node and a subset of the set of edge variables corresponding to the second edge subset, and
wherein the required dependency constraint indicates that installing the calling component requires installing, in the upgrade solution, at least one of the different versions of the called component.

12. The system of claim 8,
wherein the first set of nodes comprises a second called node corresponding to a vulnerable component with a security vulnerability,
wherein the set of constraints comprises a security constraint comprising a negation of a called node variable corresponding to the second called node, and
wherein the security constraint prevents installation of the vulnerable component in the upgrade solution.

13. The system of claim 8,
wherein the first set of nodes comprises set of called nodes corresponding to different versions of a called component,
wherein the set of constraints comprises a cardinality constraint comprising a set of called node variables corresponding to the set of called nodes, and
wherein the cardinality constraint indicates that at most one of the different versions of the called component is installed in the upgrade solution.

14. The system of claim 8, further comprising a graph constructor executing on the computer processor and configured to:
add, to the component compatibility graph, a second set of nodes corresponding to the first called components,
obtain, for the first called components, component dependencies comprising second called components,
add, to the component compatibility graph, a third set of nodes corresponding to the second called components, and
add, to the component compatibility graph, a second set of edges between the called components in the application dependencies and the calling components in the component dependencies.

15. A method, comprising:
obtaining, for an application, a first application dependency comprising first called components;
sending the first application dependency to an upgrade manager configured to perform:
  obtaining, using the first called components, a component compatibility graph comprising a first set of nodes and a first set of edges each connecting a pair of nodes in the first set of nodes, wherein the pair of nodes comprises a calling node and a called node, and wherein each node of the first set of nodes corresponds to a component,
generating, from the component compatibility graph, a set of constraints comprising a set of edge variables corresponding to the first set of edges,
selecting, using the set of constraints, a first edge subset of the first set of edges,
recommending, for the application, an upgrade solution comprising installing a first called component corresponding to a first called node connected by a first edge in the first edge subset, and
transmitting the upgrade solution; and
receiving, from the upgrade manager, the upgrade solution.

16. The method of claim 15, wherein the upgrade manager is further configured to perform:
obtaining, for the first set of edges, a set of costs indicating a level of incompatibility between the components corresponding to a pair of nodes connected by the respective edge,
wherein the first edge subset is selected using the set of costs.

17. The method of claim 16, wherein the upgrade manager is further configured to perform:
determining a number of publicly visible changes in a component corresponding to a second called node connected by a second edge of the first set of edges,
wherein the cost for the second edge is obtained using the number of publicly visible changes.

18. The method of claim 15,
wherein the first set of nodes comprises a first calling node corresponding to a calling component,
wherein the first set of edges comprises a second edge subset connecting the first calling node to a set of called nodes corresponding to different versions of a called component,
wherein the set of constraints comprises a required dependency constraint comprising a calling node variable corresponding to the first calling node and a subset of the set of edge variables corresponding to the second edge subset, and
wherein the required dependency constraint indicates that installing the calling component requires installing, in the upgrade solution, at least one of the different versions of the called component.

19. The method of claim 15,
wherein the first set of nodes comprises a second called node corresponding to a vulnerable component with a security vulnerability,
wherein the set of constraints comprises a security constraint comprising a negation of a called node variable corresponding to the second called node, and
wherein the security constraint prevents installation of the vulnerable component in the upgrade solution.

20. The method of claim 15, wherein the upgrade manager is further configured to perform:
adding, to the component compatibility graph, a second set of nodes corresponding to the first called components;
obtaining, for the first called components, component dependencies comprising second called components;
adding, to the component compatibility graph, a third set of nodes corresponding to the second called components; and
adding, to the component compatibility graph, a second set of edges between the called components in the application dependencies and the calling components in the component dependencies.

* * * * *

UNITED STATES PATENT AND TRADEMARK OFFICE
CERTIFICATE OF CORRECTION

PATENT NO. : 11,698,784 B2
APPLICATION NO. : 17/515248
DATED : July 11, 2023
INVENTOR(S) : Maine et al.

Page 1 of 1

It is certified that error appears in the above-identified patent and that said Letters Patent is hereby corrected as shown below:

On the Title Page

On page 2, Column 1, under Other Publications, Line 9, delete "Install" and insert -- Install -- therefor.

In the Specification

In Column 4, Lines 11-12, delete "that that" and insert -- that -- therefor.

In Column 7, Line 63, delete "end-of-lifed)" and insert -- end-of-life) -- therefor.

In Column 11, Line 16, delete "$C_3^1$." and insert -- $C_3^1$, -- therefor.

Signed and Sealed this
Twenty-eighth Day of May, 2024

Katherine Kelly Vidal
*Director of the United States Patent and Trademark Office*